No. 646,117. W. BAILEY. Patented Mar. 27, 1900.
SADDLE FOR BICYCLES.
(Application filed Aug. 26, 1899.)

(No Model.)

WITNESSES
John Buckler.
F. A. Stewart

INVENTOR
William Bailey
BY
ATTORNEYS

THE NORRIS PETERS CO., PHOTO-LITHO., WASHINGTON, D. C.

UNITED STATES PATENT OFFICE.

WILLIAM BAILEY, OF NEWBURY, ENGLAND.

SADDLE FOR BICYCLES.

SPECIFICATION forming part of Letters Patent No. 646,117, dated March 27, 1900.

Application filed August 26, 1899. Serial No. 728,528. (No model.)

*To all whom it may concern:*

Be it known that I, WILLIAM BAILEY, a subject of the Queen of Great Britain, residing at Newbury, in the county of Berks, England, have invented certain new and useful Improvements in Seats or Saddles for Bicycles and Similar Vehicles, of which the following is a full and complete specification, such as will enable those skilled in the art to which it appertains to make and use the same.

This invention relates to seats or saddles for bicycles and similar vehicles; and the object thereof is to provide an improved device of this class which is simple in construction and operation and the seat portion of which is supported by metal springs combined with pneumatic cushions or rings.

This invention is fully disclosed in the following specification, of which the accompanying drawings form a part, in which the separate parts of my improvement are designated by the same numerals of reference in each of the views, and in which—

Figure 1:
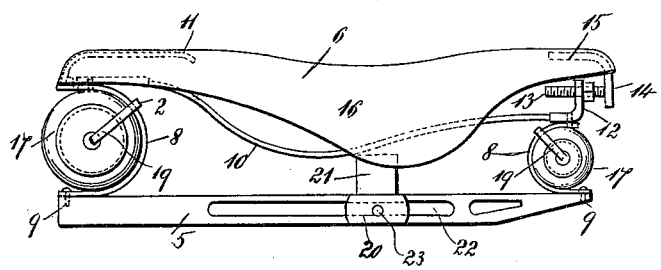
Figure 2:
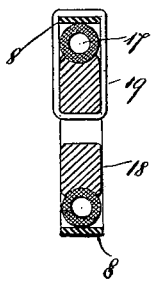

Figure 1 is a side view of my improved bicycle seat or saddle, and Fig. 2 a section of a portion of Fig. 1.

In the practice of my invention I provide a seat or saddle of the class described comprising a base portion 5 and a top portion or seat 6, and at each end of the base portion 5 is a semicircular spring 8, arranged in a vertical position and secured to said base portion 5, as shown at 9. The said seat 6 consists of a longitudinal base-spring 10, the opposite ends of which are secured to the upper ends of the semicircular spring 8, and the rear end of the spring 10 is curved upwardly and forwardly to form an arm 11, and the front end of said spring is provided with an upwardly-directed projection 12, through which passes a screw 13, to the outer end of which is secured an arm 14, which extends upwardly and backwardly, as shown at 15, and placed over the arms 11 and 15 is a longitudinal cover 16, of leather or other preferred flexible material, the front and rear ends of which are curved downwardly over the arms 11 and 15, and the sides of which are bent downwardly, as shown in Fig. 1.

In each of the semicircular springs 8 is placed a tubular pneumatic ring 17, which is mounted on a central core 18, which is deeply grooved to receive the same and is composed of soft rubber, wood, hard rubber, or other suitable material, and the pneumatic rings 17 are held to said core or secured thereto by links or bands 19, which pass around the semicircular springs, as clearly shown in the drawings. The base portion 5 is also provided with a longitudinally-adjustable slide 20, which is provided on its upper side with an upwardly-directed portion 21, and the slide 20 is also longitudinally adjustable of the base 5 by means of a longitudinal slot 22, formed in said base, and a bolt or screw 23, passed through said slide and said slot, as shown in Fig. 1. The slide 20 forms no part of my invention and comprises only means for connecting the seat or saddle with the bicycle-frame.

By means of this construction I provide a pneumatic seat which is very elastic, the pneumatic rings 17 serving as cushions and, together with the springs 8, forming a support for both ends of the seat, and the seat is free to yield in all directions to pressure applied thereto.

Having fully described my invention, I claim as new and desire to secure by Letters Patent—

1. In a bicycle-saddle, a base portion, each end of which is provided with a vertically-arranged semicircular spring, pneumatic rings imposed in said springs and connected therewith, circular cores imposed within said pneumatic rings, and links passed through said cores and about said springs, substantially as shown and described.

2. In a bicycle-saddle, a base portion, each end of which is provided with a vertically-arranged semicircular spring, pneumatic rings imposed in said springs and connected therewith, circular cores imposed within said pneumatic rings, and links passed through said cores and about said springs, said cores being peripherally grooved to form seats for said pneumatic rings, substantially as shown and described.

3. The herein-described support for bicycle and similar saddles, comprising curved spring elements, cores imposed therein, and separate links passed transversely through said cores and about said spring elements, substantially as shown and described.

In testimony that I claim the foregoing as my invention I have signed my name, in presence of the subscribing witnesses, this 10th day of August, 1899.

WILLIAM BAILEY.

Witnesses:
ALFRED HARRY DAWKINS,
CECIL WIXON CHIDDY.